United States Patent
Larson et al.

(10) Patent No.: US 7,607,014 B2
(45) Date of Patent: *Oct. 20, 2009

(54) AUTHENTICATING MAINTENANCE ACCESS TO AN ELECTRONICS UNIT VIA WIRELESS COMMUNICATION

(75) Inventors: Thane Michael Larson, Roseville, CA (US); Christopher Gregory Malone, Loomis, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 840 days.

This patent is subject to a terminal disclaimer.

(21) Appl. No.: 11/171,928

(22) Filed: Jun. 30, 2005

(65) Prior Publication Data

US 2007/0004381 A1 Jan. 4, 2007

(51) Int. Cl.
*H04L 29/06* (2006.01)
*H04L 9/32* (2006.01)
*G06F 7/04* (2006.01)
*G06F 17/30* (2006.01)
*G06F 15/16* (2006.01)
*H04N 7/16* (2006.01)

(52) U.S. Cl. .................. 713/168; 713/154; 713/173; 726/2; 726/4; 726/5; 726/26

(58) Field of Classification Search .............. 726/2, 726/4, 5, 26; 713/173, 186, 154
See application file for complete search history.

(56) References Cited

U.S. PATENT DOCUMENTS

| 5,629,981 | A | 5/1997 | Nerlikar |
|---|---|---|---|
| 5,907,491 | A | 5/1999 | Canada et al. |
| 5,960,085 | A | 9/1999 | de la Huerga |
| 6,070,240 | A | 5/2000 | Xydis |
| 6,154,137 | A | 11/2000 | Goff et al. |
| 6,172,596 | B1 | 1/2001 | Cesar et al. |
| 6,189,105 | B1 | 2/2001 | Lopes |
| 6,401,209 | B1 | 6/2002 | Klein |
| 6,747,560 | B2 | 6/2004 | Stevens, III |
| 6,813,209 | B2 | 11/2004 | Crain et al. |
| 6,825,754 | B1 | 11/2004 | Rolin |
| 6,832,251 | B1 | 12/2004 | Gelvin et al. |
| 6,836,843 | B2 * | 12/2004 | Seroussi et al. ............. 713/173 |
| 6,838,989 | B1 | 1/2005 | Mays et al. |

(Continued)

FOREIGN PATENT DOCUMENTS

GB 2423177 A1 8/2006

(Continued)

OTHER PUBLICATIONS

Want, Roy, "Enabling Ubiquitous Sensing with RFID," Computer, Invisible Computing, pp. 84-86, (Apr. 2004).

(Continued)

*Primary Examiner*—Shin-Hon Chen

(57) ABSTRACT

A maintenance control system comprises at least one electronics unit including a first wireless communicator, a second wireless communicator configured for association with an individual, and an authentication manager. The authentication manager authenticates access to the at least one electronics unit via wireless communication between the first wireless communicator and the second wireless communicator regarding a maintenance identifier stored within a memory of at least one of the first wireless communicator and the second wireless communicator.

20 Claims, 5 Drawing Sheets

U.S. PATENT DOCUMENTS

| | | | |
|---|---|---|---|
| 6,842,121 B1 | 1/2005 | Tuttle | |
| 7,176,849 B1 * | 2/2007 | Mooney et al. | 345/2.3 |
| 7,357,318 B2 * | 4/2008 | Honda | 235/385 |
| 7,363,505 B2 * | 4/2008 | Black | 713/186 |
| 2002/0077996 A1 * | 6/2002 | Regelski et al. | 707/1 |
| 2002/0147924 A1 * | 10/2002 | Flyntz | 713/200 |
| 2003/0034877 A1 | 2/2003 | Miller et al. | |
| 2003/0046339 A1 | 3/2003 | Ip | |
| 2003/0114104 A1 | 6/2003 | Want et al. | |
| 2004/0257202 A1 | 12/2004 | Coughlin et al. | |
| 2005/0042986 A1 | 2/2005 | Willgert | |
| 2005/0081136 A1 * | 4/2005 | Morris-Jones et al. | 715/500 |
| 2005/0105734 A1 | 5/2005 | Buer et al. | |
| 2005/0116822 A1 * | 6/2005 | Wang et al. | 340/539.13 |
| 2005/0193182 A1 * | 9/2005 | Anderson et al. | 711/163 |
| 2005/0218215 A1 * | 10/2005 | Lauden | 235/380 |
| 2005/0222933 A1 * | 10/2005 | Wesby | 705/36 |
| 2006/0001544 A1 * | 1/2006 | Siefke et al. | 340/572.4 |
| 2006/0055508 A1 * | 3/2006 | Kumar et al. | 340/5.2 |
| 2006/0090079 A1 * | 4/2006 | Oh et al. | 713/186 |
| 2006/0123463 A1 * | 6/2006 | Yeap et al. | 726/2 |
| 2006/0136997 A1 * | 6/2006 | Telek et al. | 726/5 |
| 2006/0240771 A1 * | 10/2006 | Graves et al. | 455/39 |

FOREIGN PATENT DOCUMENTS

| | | |
|---|---|---|
| WO | WO 2004/006051 | 1/2004 |
| WO | WO 2005/001642 | 1/2005 |
| WO | WO2005/001671 A1 | 1/2005 |
| WO | WO2005/080720 A1 | 9/2005 |

OTHER PUBLICATIONS

National Semiconductor Corporation, "LM79 Microprocessor System Hardware Monitor," DS100036, pp. 1-30, (2001). <www.national.com>.

National Semiconductor Corporation, "Thermal Management Products," Selection Guide, pp. 5, (Fall 2004).

Gilbert, Alorie, "HP puts RFID on the Rack", CNET News, (2 pgs.), (Nov. 1, 2004), <http://news.zdnet.co.uk>.

Aviation Today, "RFID: The Future of MRO Supply Chain Management", pp. 1-8, (Feb. 2, 2005), <www.aviationtoday.com>.

RFID Journal, "New Low-Cost Temperature Sensor", (2 pgs.), (Feb. 11, 2005), <www.rfidjournal.com>.

Comparetti, Alfredo Milani, SpeedFan, "Access Temperature Sensor in your Computer", (3 pgs.), (2000-2005), <www.almico.com>.

DarkVision Hardware, "Motherboard Monitor 5", (4 pgs.), (Feb. 11, 2005), <www.dvhardware.net>.

* cited by examiner

AUTHENTICATING MAINTENANCE ACCESS TO AN ELECTRONICS UNIT VIA WIRELESS COMMUNICATION

BACKGROUND

As computers and computer networks have become more sophisticated, maintenance of those computers has become more specialized. Moreover, computer manufacturers compete not only on sales but on service as well. Accordingly, computer manufacturers and/or suppliers of other electronic equipment are highly interested that the products are maintained and/or repaired properly to maintain consumer perception of the high quality of their products. This aspect has become increasingly important because low end computers are a commodity item and slight shifts in perception of quality can result in significant shifts in sales volume. Moreover, as computer manufacturers attempt to differentiate themselves from their competitors, great attention is given to providing maintenance to insure optimal operation of high-end computers and related equipment.

Unfortunately, many individuals, companies, and/or service providers will attempt to perform maintenance on computers without direct guidance from the manufacturers. When this maintenance is performed poorly, the equipment may not function properly. All too often the owner of the equipment begins to associate the performance issues with the manufacturer when in fact the performance issues may arise out inexperienced or unqualified personnel performing the maintenance. In addition, in some situations, only a single piece of equipment requires maintenance but locating or identifying that equipment among high population of equipment can be difficult. Conversely, insuring that only authorized personnel are performing the maintenance is equally difficult. Finally, computer systems must be protected against mischievous interlopers bent on interfering with normal operation of a computer system.

For these reasons, administrators of computers and computer resources, as well as administrators of other types of workstations, still face challenges in effectively controlling access to perform maintenance on those resources.

SUMMARY

Embodiments of present invention are directed to wirelessly controlling maintenance access for an electronics system. In one embodiment, a maintenance control system comprises at least one electronics unit including a first wireless communicator, a second wireless communicator configured for association with an individual, and an authentication manager. The authentication manager authenticates access to the at least one electronics unit via wireless communication between the first wireless communicator and the second wireless communicator regarding a maintenance identifier stored within a memory of at least one of the first wireless communicator and the second wireless communicator.

DETAILED DESCRIPTION

Figure 1:
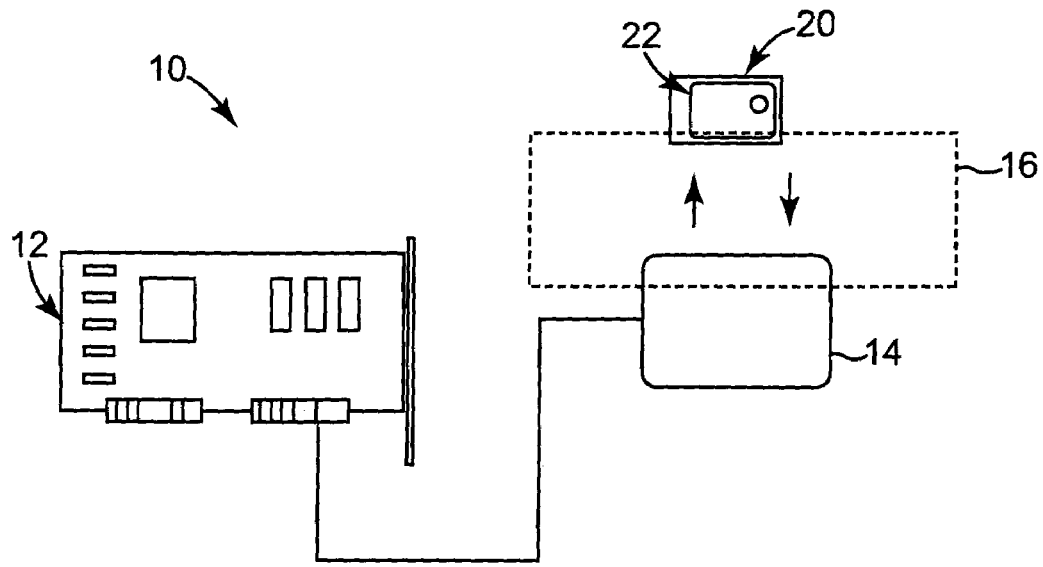
FIG. 1 is a plan view schematically illustrating a RFID system, according to an embodiment of the invention.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Embodiments of the invention are directed to controlling maintenance access to an electronics system computer system via wireless communication. In one embodiment, a tag or badge associated with a person, stores information regarding the person and information regarding authorization to access the electronics system for maintenance by that person. The information is communicated between the tag and an access manager of the electronics system via wireless communication to enable controlling maintenance access to the electronics system. Maintenance includes, but is not limited to, inspection, repairs, upgrades, replacement, warranty verification, alteration, and/or modification of the at least one electronics unit, or components thereof.

In one embodiment, the electronics system comprises a computer system including at least one computer. In another embodiment, the electronics system comprises at least one electronics unit, such as a printer, a fax machine, a digital sender, a computer, a server, etc. In another embodiment, the electronics system comprises at least one server.

Wireless communication greatly simplifies controlling maintenance access to a computer system because it provides a communication pathway independent of other connections and pathways forming the electronics system/network. In one embodiment, a RFID (radio frequency identification) transponder is disposed on a tag, such as a personnel tag or badge, which then communicates via radiofrequency signals with a RFID transceiver disposed within or on one or more electronics units (e.g., computers, printers, etc.) of the electronics system. Each RFID transponder stores information about one or more parameters of the individual (associated with the tag) and of the electronics unit to insure that the right individual, such as an employee, is accessing the right equipment. This authentication is performed electronically, instead of or in addition to a physical access mechanism, such as a locked room and/or biometric access device. This authentication for maintenance personnel also is performed, in some instances, as an additional security layer beyond conventional password measures.

In another embodiment, a RFID transponder is disposed within or on a tag secured to at least one electronics unit of the electronics system, which then communicates via radiofrequency signals with a RFID transceiver associated with a technician. In one embodiment, the RFID transceiver (associated with the technician) is disposed within a mobile computing device and also wirelessly communicates with a RFID transponder tag worn by the technician to insure that only authorized personnel are operating the mobile computing device (to communicate with the at least one electronics unit). Accordingly, the tag (or badge) worn by the technician and the mobile computing device wirelessly communicate with each other to authenticate the technician as an authorized user of the mobile computing device while the mobile computing device wirelessly communicates with the at least one electronics unit to authenticate the technician and at least one electronics unit with each other.

In one embodiment, the individual comprises an administrator of the electronics system. In other embodiments, the individual(s) comprises a technician, such as an original equipment manufacturer (OEM) technician, an authorized third party technician, or a technician employed by the organization owning the electronics system. One or more of these individuals are referred to as personnel throughout this description, and are identified via a personnel identifier.

In one embodiment, information exchanged between a RFID transceiver and a RFID tag comprises a maintenance identifier. In one aspect the maintenance identifier comprises an access identifier. In another aspect, the maintenance identifier comprises a personnel identifier. In yet another aspect, the maintenance identifier comprises an access identifier and a personnel identifier.

In one embodiment, an access identifier associated with an individual is stored in RFID transponder tag or the transceiver and identifies the type of access privileges for that individual based on the individual's status, such as original equipment manufacturer (OEM) technician, authorized third party technician, administrator, or internal technician, etc. In one embodiment, the access identifier also identifies the level of access privileges, such as whether the individual gets access to a single electronics unit, a local unit, an equipment network, and/or a particular location/area of electronics units, etc. This information regarding an individual is compared to database (of employee or personnel information and access information) of an authentication manager of the electronics unit to determine whether access will be granted to the technician (or other personnel) and which type and/or level of access is granted.

Accordingly, embodiments of the invention enable new ways of controlling maintenance access to workstation systems via wireless communication pathways. Embodiments of the invention are described and illustrated in detail in association with FIGS. 1-7.

In one embodiment of the invention, a wireless communication pathway is established via radio frequency waves, and in particular via a radio frequency identification (RFID) system. Accordingly, one exemplary embodiment of a RFID system is described and illustrated in association with FIGS. 1-2 as a foundation for a description of wirelessly controlling maintenance access for an electronics system, as described and illustrated in association with FIGS. 3-7.

FIG. 1 illustrates radio frequency identification (RFID) system 10. RFID system 10 includes transceiver 12 and transponder 20. Transceiver 12 includes transceiver antenna 14. Transponder 20 includes transponder antenna 22. Signals generated by transceiver antenna 14 and by transponder antenna 22 are transferred through medium interface 16.

Transceiver 12 of RFID system 10 is configured to communicate with transponder 20. In one embodiment, transceiver 12 includes a microprocessor, and in another embodiment, transceiver 12 is coupled to a host system that includes a microprocessor. In one embodiment, transceiver antenna 14 is integrated within a single transceiver device. In one embodiment, transceiver 12 includes a separate transceiver circuit device and a separate transceiver antenna 14. Transceiver antenna 14 emits radio frequency signals that are transmitted through medium 16 to activate transponder 20. After activating transponder 20, transceiver 12 reads and writes data to and from transponder 20. Transceiver antenna 14 and transponder antenna 22 are the conduits between transceiver 12 and transponder 20, and communicate radio frequency signals through medium interface 16.

In some embodiments, medium interface 16 is air, and in other embodiments medium interface 16 includes air and other materials. Transceiver antenna 14 and transponder antenna 22 can be of a variety of shapes and sizes, dependent upon the anticipated distance separating them, the type of medium 16 that is between antennas 14 and 22, and on other factors.

Transceiver 12 typically performs a variety of functions in controlling communication with transponder 20. In one case, transceiver 12 emits output signals from transceiver antenna 14, thereby establishing an electromagnetic zone for some distance adjacent antenna 14. When transponder 20 passes through the electromagnetic zone established by transceiver antenna 14, transponder 20 detects an activation signal from transceiver 12. Transponder 20 typically has integrated circuits that include data that is encoded in memory. Once transponder 20 is activated with the activation signal, transceiver 12 decodes data that is encoded in transponder 20. For instance, in one embodiment transceiver 12 performs signal conditioning, parody error checking and correction.

Typically, transceiver 12 emits radio waves in ranges from a few millimeters up to hundreds of feet or more, depending on its output power and upon the radio frequency used. In one case, transceiver 12 is integrated in a circuit board card that is then coupled to a host computer, which processes the received data and controls some of the communication with transponder 20.

Figure 2:
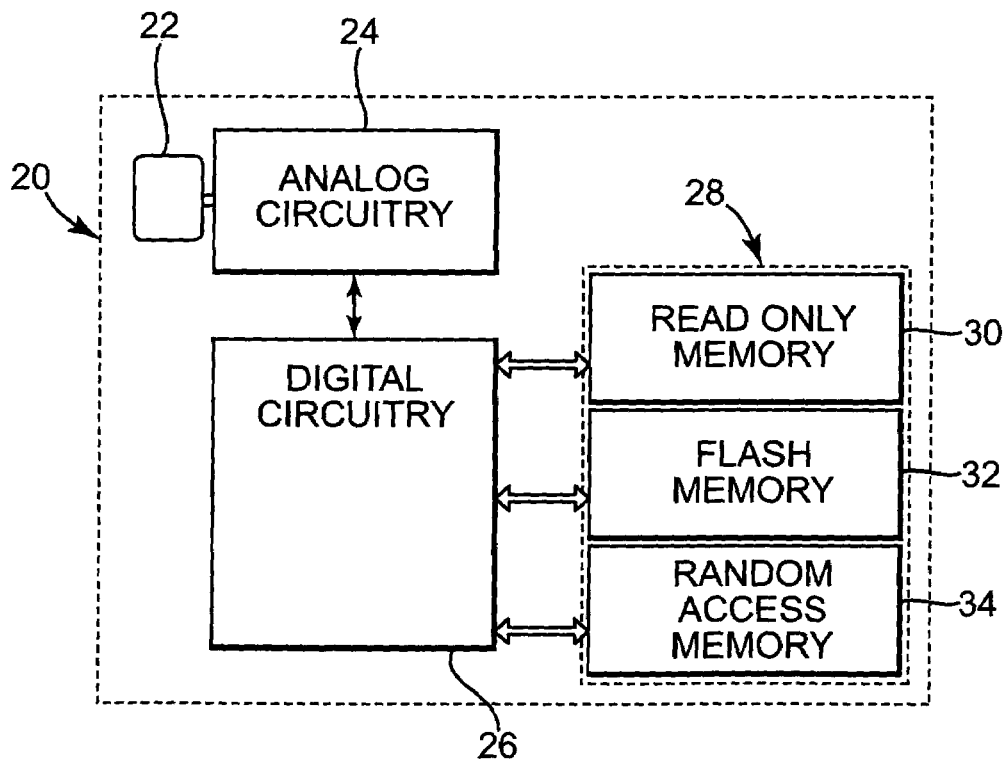
FIG. 2 is a block diagram of a transponder of a RFID system, according to an embodiment of the invention.

FIG. 2 illustrates one embodiment of transponder 20. In one case, transponder 20 includes transponder antenna 22, analog circuitry 24, digital circuitry 26, and memory 28. In various embodiments, memory 28 can include read only memory (ROM) 30, flash memory 32, and/or random access memory (RAM) 34.

Transponder 20 comes in a variety of shapes and sizes for use in a variety of applications. In one embodiment, transponder 20 is a tag, thin card, or badge. In one embodiment, the transponder 20 is adhesively securable as a tape to an identification badge.

In some embodiments, transponder 20 includes one or more types of memory 28. For example, in some embodiments memory 28 includes ROM 30 to accommodate security data and operating system instructions that are employed in conjunction with analog circuitry 24 and digital circuitry 26 to control the flow of data within transponder 20. In other embodiments, memory 28 includes RAM 34 to facilitate temporary data storage during a time period when transceiver 12 is interrogating transponder 20 for a response. In other embodiments, memory 28 includes flash memory 32 to store data in transponder 20 that is non-volatile in order to ensure that the data is retained when transponder 20 is in a quiescent or power saving state. In some embodiments, memory 28 includes other types of non-volatile programmable memory, such as programmable read-only memory (PROM), erasable programmable read-only memory (EPROM), and electrically erasable programmable read-only memory (EEPROM). Any one of memory types ROM 30, flash memory 32 (or other non-volatile programmable memory), or RAM 34 can be used, or any combination thereof can be used.

In one embodiment, transponder 20 is an active transponder device. An active transponder is powered by an internal energy source, such as a battery configured within analog circuitry 24. Such active transponders are typically "read/write," which means data stored within memory 28 of transponder 20 can be rewritten and/or modified. An active transponder can also be powered from an existing source in another electronic device. For example, where transponder 20 is an active transponder coupled within a computer system, the power supply within the computer system supplies power to the transponder.

In one embodiment, transponder 20 is a passive transponder device. Passive transponders operate without a separate internal power source and obtain operating power from transceiver 12. Rather than having a battery within analog circuitry 24, for example, passive tags instead can use a strongly capacitive circuit and a charge pump within analog circuitry 24. The capacitive circuit and charge pump are configured to receive radio frequency energy from transceiver 12 and store it for use within transponder 20, for example, to control digital circuit 26 and memory 28.

Since active transponders accommodate an internal battery, they are typically larger in size than passive transponders. Memory size within an active transponder varies, but can be fairly significant with some systems operating, for example, with up to a megabyte or more of memory. Active transponders also typically have a longer ready range such that transceiver 12 and transponder 20 are typically placed apart at greater distances than in the case of passive transponders. In the same way, passive transponders typically have shorter read ranges, but are typically much smaller and lighter than active transponders and are typically less expensive.

In addition to including a battery for active transponders or capacitive circuit and charge pump for passive transponders, analog circuitry 24 typically include interface circuits for data transfer between transponder antenna 22 and digital circuitry 26. Digital circuitry 26 in turn typically includes control logic, security logic, and internal logic or microprocessor capabilities. This control logic controls the flow of data to and from memory 28.

Accordingly, transceiver 12 and transponder 20 together establish a robust wireless communication pathway or network adaptable to a variety of environments.

Figure 3:
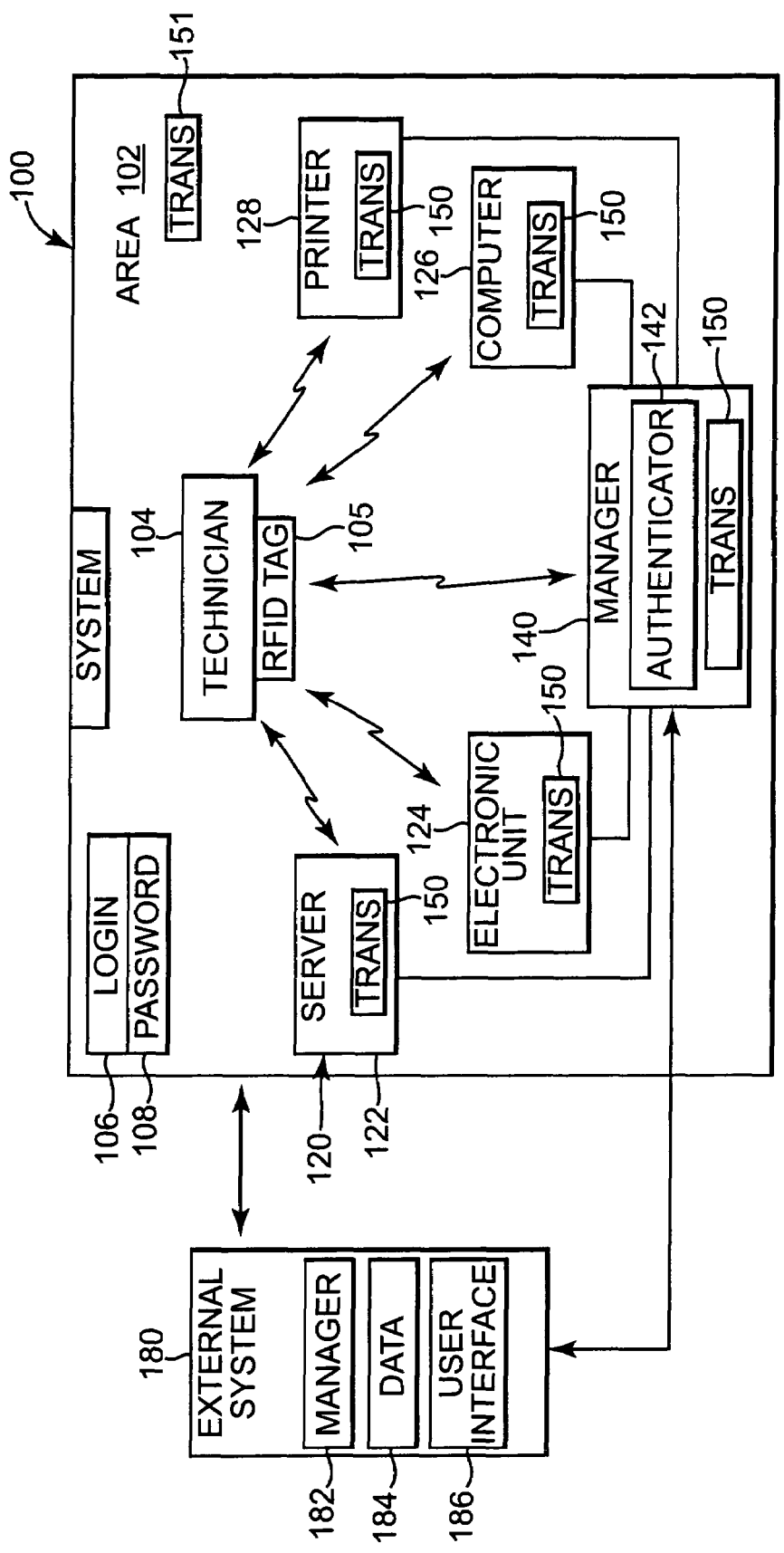
FIG. 3 illustrates an electronics system, according to an embodiment of the invention.

According to one embodiment of the invention, transceiver 12 or transponders 20 are associated with at least one electronics unit to enable controlling maintenance access to the at least one electronics system via wireless communication. FIG. 3 is a block diagram of electronics system 100 including an authentication mechanism, according to one embodiment of the invention, deployed to protect maintenance access to electronics system 100.

As shown in FIG. 3, a technician 104 is proximate to an access area 102 that includes electronics system 100 with the technician 104 wearing RFID transponder tag 105. Electronics system 100 includes login module 106 with password function 108, manager 140 with authenticator 142, and array 120 of electronics units (such as computers or computer resources) 122-128. Each electronic unit 122-128 of array 120 also comprises RFID transceiver 150. In addition, in one embodiment access area 102 comprises transceiver 151.

In one embodiment, manager 140 also comprises a transceiver 150 while in other embodiments, manager 140 does not include a transceiver 150. Transceiver 150 and transceiver 151 have substantially the same features and attributes of transceiver 12, and transponder of RFID transponder tag 105 has substantially the same features and attributes as transponder 20, as previously described and illustrated in association with FIGS. 1-2. While uniquely associated with technician 104, RFID transponder tag 105 also functions alongside and/or as part of electronics system 100 to protect access to electronics system 100.

In one embodiment, electronics units 122-128 of array 120 includes different types of electronic units, including but not limited to server 122, computer 126 (e.g., a workstation, a personal computer, a mainframe, a server, etc.), and printer 128. Electronics unit 124 includes but is not limited to a scanner, a facsimile machine, a digital sender, as well as other types of electronic units, such computer 126 or server 122.

As shown in FIG. 3, access area 102 defines an area in which RFID transponder tag 105 is in close enough proximity to communicate wirelessly with an array 120 of electronics units or electronics resources 122-128 via their transceivers 150. Manager 140 comprises a network type manager for monitoring and controlling maintenance access to electronics units 122-128 of electronics system 100, and is in wired communication with each of those electronics units 122-128. In one embodiment, authenticator 142 of manager 140 enables authenticating technician access to each electronics unit of electronics system 100, and is further described and illustrated in association with FIG. 5.

In one embodiment, access area 102 comprises any area that is physically controlled and/or electronically controlled in which electronics system operates and for which maintenance access is to be controlled with embodiments of the invention. In one embodiment, access area 102 comprises a closed room or building enclosing electronics system 100. In another embodiment, access area 102 comprises an open area, such as a public library that includes electronics system 100.

RFID transponder tag 105 conveys information to manager 140 via transceiver 150 about a technician 104 or other individual(s) attempting to gain access to one of the electronics units 122-128 of electronics system 100 or to area 102 that contains array 120. The information is stored in a memory (e.g., memory 28 in FIG. 1-2) of RFID transponder tag 105 for transmission to transceiver(s) 150. If the information on RFID transponder tag 105 matches information (e.g., predetermined criteria within a memory or accessible from a remote database) within manager 140, access is granted to perform maintenance electronics system 100, as described in more detail in association with FIGS. 3-6.

In one embodiment, each RFID transponder tag 105 comprises a passive transponder. In another embodiment, one or more RFID transponder tags 105 comprise an active transponder.

As shown in FIG. 3, each transceiver 150 is disposed within or on each electronics units 100 of electronics system 100 for wireless communication from each transceiver 150 with RFID transponder tag(s) 105. In one embodiment, transceiver 150 of each computer obtains its power from a source (e.g., an internal battery) different than components of computer system so that the independent communication pathway of RFID transponder tag(s) 105 and transceivers 150 of each computer enable access control monitoring of a electronics system 100 even when an individual electronics unit of electronics system 100 is not powered up. In one embodiment, this feature enables manager 140 to verify authority to access an individual electronics unit and prevent the electronics units from being power up if access is not authorized for that individual. In one aspect, manager 140 performs this verification by direct wireless communication between RFID transponder tag 105 and transceiver 150 of manager 140, rather than between RFID transponder tag 105 and a transceiver 150 of one or more electronics unit(s) 122-128 (which in turn would communicate via wired pathways with manager 140).

Accordingly, transceivers 150 and RFID transponder tag(s) 105 enable a wireless communication network that is transparent to the normal function and operation of components of the electronics system yet which enables controlling maintenance access to the electronics system in cooperation with a manager 140 of the electronics system 100.

In one embodiment, electronics system 100 includes only a single electronics unit from array 120 with that electronics unit including authentication manager 142 for monitoring maintenance access to the single electronics unit. The single electronics unit still includes transceiver 150 for wireless communication with transponder tag 105 to enable controlling access to the single electronics unit.

Login module 106 enables a technician or other authorized personnel to identify themselves to electronics system 100, such as through a user interface, while password function 108 enables the use of passwords to limit login access to only authorized individuals. However, in one embodiment, RFID transponder tag 105 stores in its memory the login information (e.g., user name) and password information so that the login and password functions are carried out wirelessly between RFID transponder tag 105 and manager 140 via transceiver 150, rather than through conventional keyboard or user interface entry. This feature eliminates the often monotonous keyed entry of login and password information for technicians.

Wireless communication between RFID transponder tag 105 and transceiver 150 is distant dependent. Accordingly, when a technician with RFID transponder tag 105 moves out of range of communication with transceiver 150, wireless communication ceases and access to electronics system 100 is terminated. In one embodiment, the signal range between RFID transponder tag 105 and transceiver 150 is set via manager 140 to correspond to a predetermined physical distance between the individual and one or more of electronics units 122-128. Accordingly, as long as the technician with RFID transponder tag 105 is within that physical distance relative to electronics units 122-128, access is maintained. However, when the technician with RFID transponder tag 105 exceeds that physical distance relative to electronics units 122-128, access is terminated. This feature insures that a technician will be protected from unauthorized users when the technician is left unattended by a technician (having authorized access) that temporarily or permanently departs from access area 102.

In another embodiment, access to the entire electronics system 100 including every electronics units 100 is granted via wireless communication between RFID transponder tag 105 and only one of electronics units 122-128 or between RFID transponder tag 105 and manager 140, so that the technician is then free to use any electronics units 100 in electronics system 100.

As shown in FIG. 3, in one embodiment, electronics system 100 is in communication with external system 180, which includes manager 182, data module 184, and user interface 186. User interface 186 is configured to display and enable operation of manager 182 of external system 180 and/or of manager 106 of electronics system 100. In one embodiment, manager 182 is configured to manage operations of a plurality of electronics systems, such as electronics system 100, so that manager 182 acts as a central monitoring station of several electronics systems, each of which have their own wireless monitoring mechanism. In one embodiment, external system 100 is an electronics system while in other embodiments, external system 100 is a computer system or server system.

Figure 4:
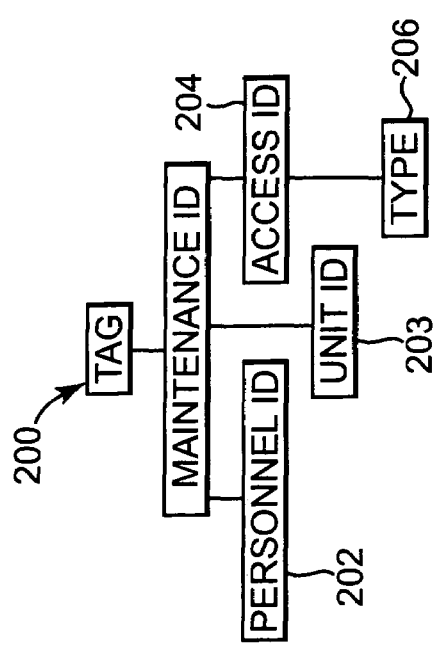
FIG. 4 is a block diagram schematic illustrating a RFID transponder tag, according to an embodiment of the invention.

In use, electronics system 100 controls maintenance access by a technician. In one embodiment, technician 104 enters access area 102 and tag 105 wirelessly communicates with transceivers 150 of electronic units 120-128 and/or manager 140 to evaluate attempted access by technician for maintenance purposes. Once the technician is in range, transceiver(s) 150 grant access to technician 104 when a maintenance identifier stored in tag 105 meets predetermined criteria stored within transceiver(s) 150. In this arrangement, authentication comprises automatically identifying which technicians are authorized to perform maintenance on an electronics unit. In another embodiment described later in association with FIG. 5, wireless communication between an electronics unit and technician enables automatic identification of which electronics unit (among multiple electronics units) is authorized for maintenance FIG. 4 is a schematic illustration of a RFID transponder tag, according to one embodiment of the invention. As shown in FIG. 4, RFID transponder tag 200 comprises maintenance identifier 201 that includes one or more of personnel identifier 202, unit identifier 203, and access identifier 204 with type identifier 206. RFID transponder tag 200 has substantially the same features and attributes as RFID transponder tag 105 as previously described in association with FIGS. 1-3. Personnel identifier 202 and access identifier 204 together specify information about an individual for evaluation by authentication manager 142 to determine whether maintenance access to one or more electronics units 122-128 of electronics system 100 will be granted. Various aspects of personnel identifier 202 and access identifier 204 are described and illustrated in association with FIGS. 5-7. In one embodiment, personnel identifier 202 comprises a personnel identifier for identifying an individual for which access can be granted, whether or not that individual is a technician, vendor, etc. However, to gain access to an electronic unit 122-128 or electronics system 100 generally, the individual will be listed within a database of personnel, such as an employee database or technician database, vendor database, or similar database available for confirming the identity of that individual.

Figure 5:
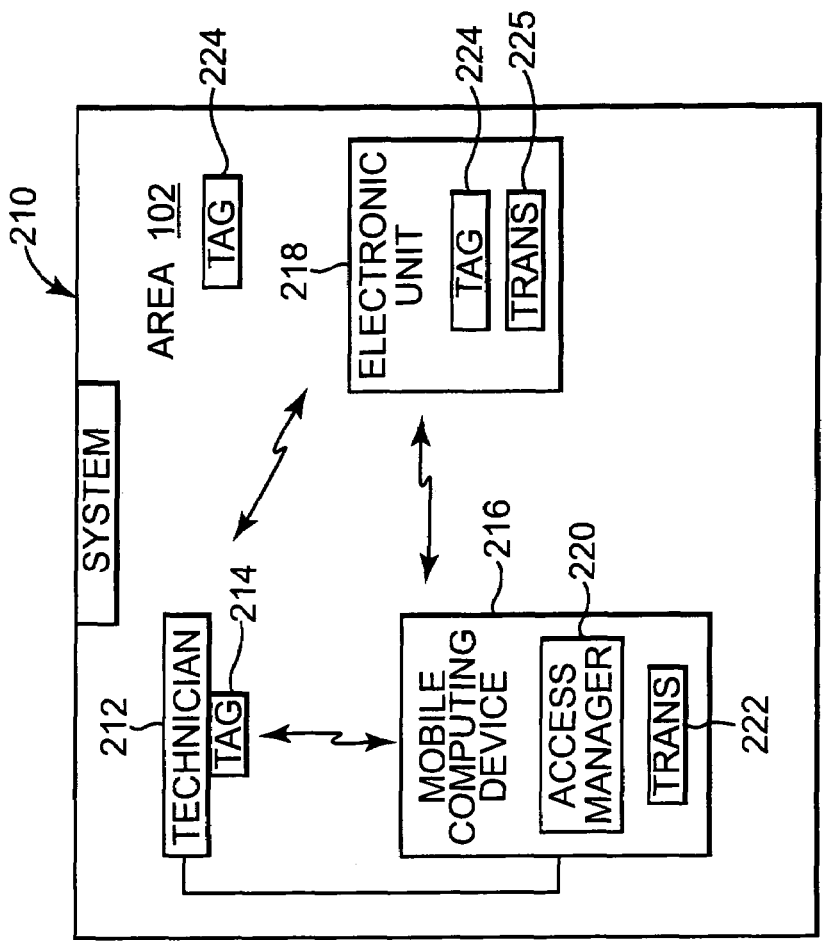
FIG. 5 is a block diagram of an authenticator manager, according to an embodiment of the invention.

FIG. 5 is a block diagram of an electronics system 210, according to one embodiment of the invention. As shown in FIG. 5, electronics system 210 comprises technician 212 with RFID tag 214 (such as a badge), mobile computing device 216, and electronic unit(s) 218. Mobile computing device 216 comprises access manager 220 and transceiver 222. Access manager 220 and transceiver 222 comprise substantially the same features and attributes as authentication module 142 and transceiver 150, as previously described in association with FIGS. 1-3. In one embodiment, mobile computing device 216 comprises, but is not limited to, a personal digital assistant, a handheld computer, or a wireless phone.

Electronics unit 218 comprise substantially the same features and attributes as electronics unit(s) 122-128, as previously described in association with FIGS. 1-3. In one embodiment, electronic unit(s) 218 comprises RFID transceiver 225 which is wireless communication with RFID transponder tag 214 and/or transceiver 222 of mobile computing device 216.

In another embodiment, electronic unit(s) 218 comprises RFID tag 224, which is configured for wireless communication with transceiver 222 of mobile computing device 216. In this embodiment, system 210 has substantially the same features and attributes as system 100 except for the placement of transponders and transceivers in different locations relative to technicians and the electronics units.

In use, a technician 212 enters access area 102 of electronics system 210 wearing tag 214 and carrying (or wearing) mobile computing device 216. Wireless communication between RFID tag 214 and RFID transceiver 222 within mobile computing device 216 insures that authorized personnel is in possession of mobile computing device 216, and enables active use of mobile computing device 216 for performing maintenance. In addition, once within access area 102, mobile computing device 216 identifies, via wireless communication between transceiver 222 of mobile computing device 216 and tag 224 (or transceiver 225) of electronics unit 218, which electronics unit 218 among a plurality of electronics units is authorized for maintenance by technician 212. In one embodiment, further wireless communication between mobile computing device 216 and electronics units 218 includes exchanging maintenance information. Maintenance information includes but is not limited to performance specifications, usage history, diagnostic information, warranty parameters, ownership data, operating parameters etc. to enable maintenance on electronics unit 218 by technician. In one embodiment, mobile computing device 216 accesses maintenance instructions from its internal memory (or by downloading from an external database or manager 140) for electronics unit 218 to enable optimal maintenance by technician 214 on electronics unit 218.

In this arrangement, authentication comprises automatic identification to the technician of one or more electronics units that require maintenance while electronics system 210 is protected against unauthorized individuals attempting to service electronics unit(s) 218. In addition, authentication also includes exchanging maintenance information (e.g., performance specifications, warranty parameters, etc.) facilitate the maintenance.

Figure 6:
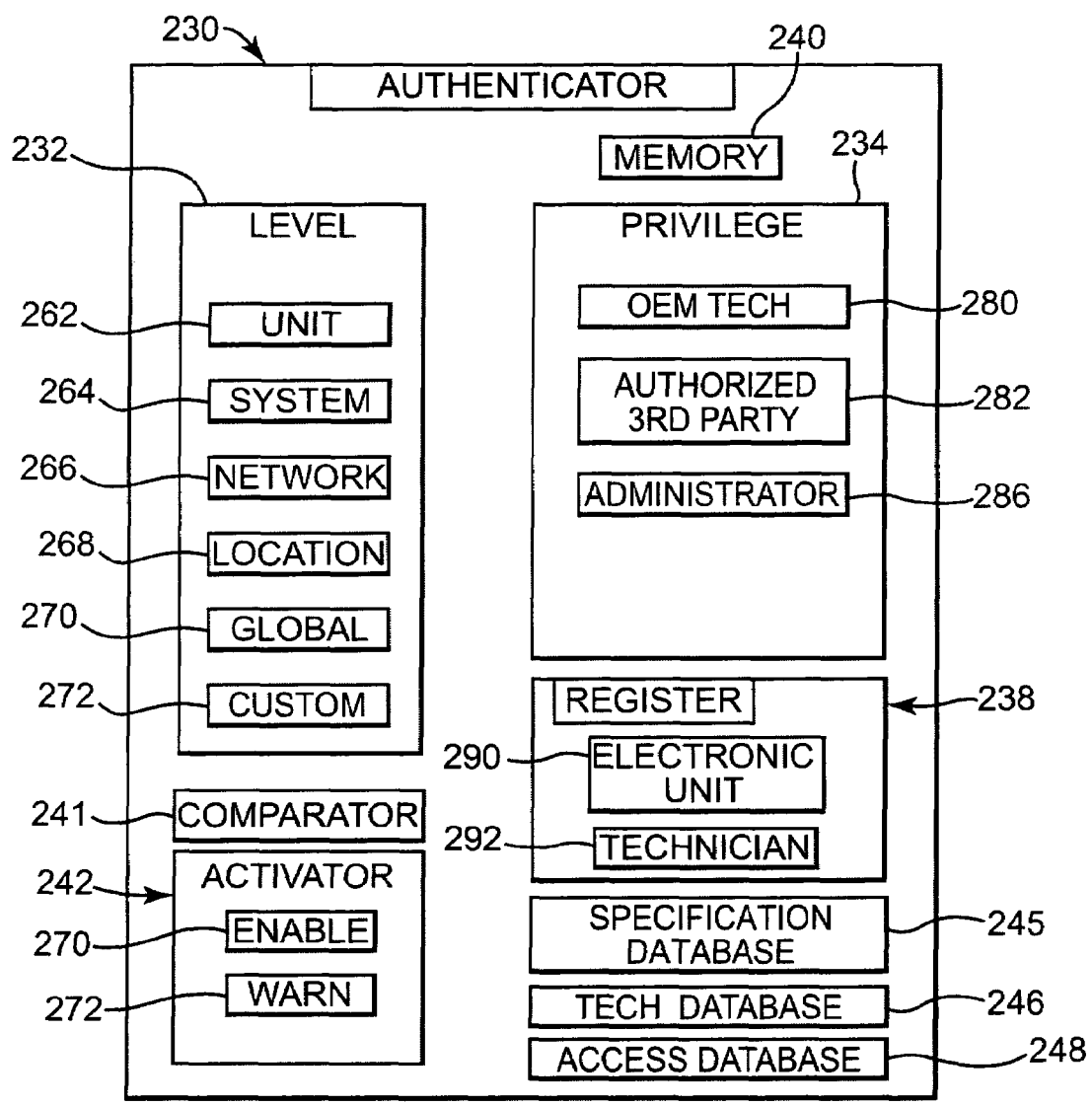
FIG. 6 is a block diagram of an access monitor, according to an embodiment of the invention.

FIG. 6 is a block diagram of an authenticator manager 230, according to an embodiment of the invention. Authenticator manager 230 is configured to control access by maintenance personnel, such as technicians, administrators, etc. to electronics system 100, and has substantially the same features and attributes as authentication module 142 of manager 140 (FIG. 3), and additional features described herein.

As shown in FIG. 6, authenticator manager 230 comprises access level module 232, privileges module 234, register 238, memory 240, comparator 241, activator 242, employee database 246, and access database 248.

Level module 232 of authenticator manager 230 comprises one or more parameters that act to determine the level of access within electronics system 100. In one embodiment, the level of access is based on the type of technician or person that is attempting access, with some types of individuals receiving limited access and other types of individuals receiving broader or unlimited access. In one embodiment, access level module 232 comprises unit parameter 262, local system parameter 264, network parameter 266, location parameter 268, global system/network parameter 270, and custom parameter 272. Unit parameter 262 specifies that the individual will get access only to a single electronics unit, while local system parameter 264 specifies that the individual will get access to a local system of multiple electronics units. Network parameter 266 specifies that the individual will get access to an entire network of electronics units including one or more local systems of electronics units, such as a local network of computers, printers, and/or servers. Global parameter 270 specifies that the individual will get access to a global group of electronics networks while custom parameter 272 specifies that the individual will get access to one or more electronics units based on a custom level of access set by an administrator.

Privileges module 234 of authenticator manager 230 comprises one or more parameters that act to determine the type of privileges available when access is granted. In one embodiment, the type of privileges granted is based on the type of individual that is attempting access, with some types of individuals receiving limited access and other types of individuals receiving broader or unlimited access. In one embodiment, privileges module 234 comprises original equipment manufacturer (OEM) technician parameter 280, authorized third party technician parameter 282, internal technician parameter 284, and administrator parameter 286. Original equipment manufacturer (OEM) technician parameter 280 identifies an individual as a technician from the original equipment manufacturer of the electronics unit. Authorized third party technician parameter 282 identifies individuals as a technician employed by a third party (not the owner of the electronics unit and not the original equipment manufacturer) authorized by the original equipment manufacturer to perform maintenance on the electronics unit. Technician parameter 284 identifies individuals, typically an employee of an organization, with special privileges unavailable to general users and/or general managers to enable the technician to perform maintenance and repair of electronics system 100. Administrator parameter 286 identifies individuals with the broadest privileges for top level management of electronics system 100, including monitoring the activities of all users, managers, technicians, and any other personnel with access privileges granted by the administrator.

Memory 240 comprises firmware, hardware, internal and/or external media devices (or circuitry) used to store authenticator manager 230 and all of the values or settings of the parameters of authenticator manager 230.

In addition, the parameters of the level module 232 and the parameters of privileges module 234 can be used together to provide information about an individual, such as a technician. In one embodiment, one parameter of privilege module 234 is linked to one or more parameters of level module 232. For example, a technician is authorized access to a unit (via unit parameter 262) or system level (via system parameter 264) of access but not to a network level (via network parameter 266) or global level (via global parameter 270) of access. In another example, an administrator is granted access to all levels of access (e.g., unit, system, network, etc.). This linking feature enables authenticator module 230 to verify that a person (e.g., OEM technician, third party technician, administrator, etc.) should have access to the level of the electronics system or computer system for which access is being attempted.

As shown in FIG. 6, register 238 tracks which individual have access to the computer system via wireless communication and which electronics units, such as computers (or computer resources) are being accessed via wireless communication. In one embodiment, the technicians (or other persons) with maintenance access are tracked via technician parameter 292 while the electronic units (e.g., computers or computer peripherals) accessed are tracked via electronics unit parameter 290.

Technician database 246 comprises a database of all technicians associated with an organization, including information about their role, if any, within the organization or relative to the electronics system. In particular, each technician listed within technician database 246 carries a personnel identifier 202 that uniquely identifies that technician relative to electronics system 100 and/or system 210. In one embodiment, the personnel identifier 202 is embodied electronically within RFID transponder tag 200, as previously described in association with FIG. 4.

Access database 248 comprises a database of which technicians or other persons in technician database that have authorization to access the electronics system. In particular, each technician listed within technician database 246 carries an access identifier 204 that identifies a type of access (via privileges module 234) or level of access (via level module 232), if any, that is uniquely associated with the technician via personnel identifier 202. In one embodiment, the access identifier 204 is embodied electronically within RFID transponder tag 200 as previously described in association with FIG. 4.

Comparator 241 performs a comparison of a personnel identifier 202 and/or an access identifier 204 (FIG. 4) against technician database 246 and access database 248 to determine whether access will be granted and which type/level of access is to be granted. Activator 242 controls activation of access to electronics system 100 based on the results of comparisons made by comparator 240 regarding an attempted access. In one embodiment, enable function 270 of activator 242 enables maintenance access or prevents maintenance access, respectively, based on the results of the comparison. If access is to be granted, then the type of access is set via privileges module 234 and the level of access is set via access level module 232.

Warn function 272 of activator 440 warns an administrator (or other person or organization such as the manufacturer) via manager 140 (FIG. 3) of an unsuccessful attempt to access the electronics system for maintenance via RFID transponder tag 105. Alternatively, warn function 272 can be replaced by an okay function which identifies that access should be granted.

Figure 7:
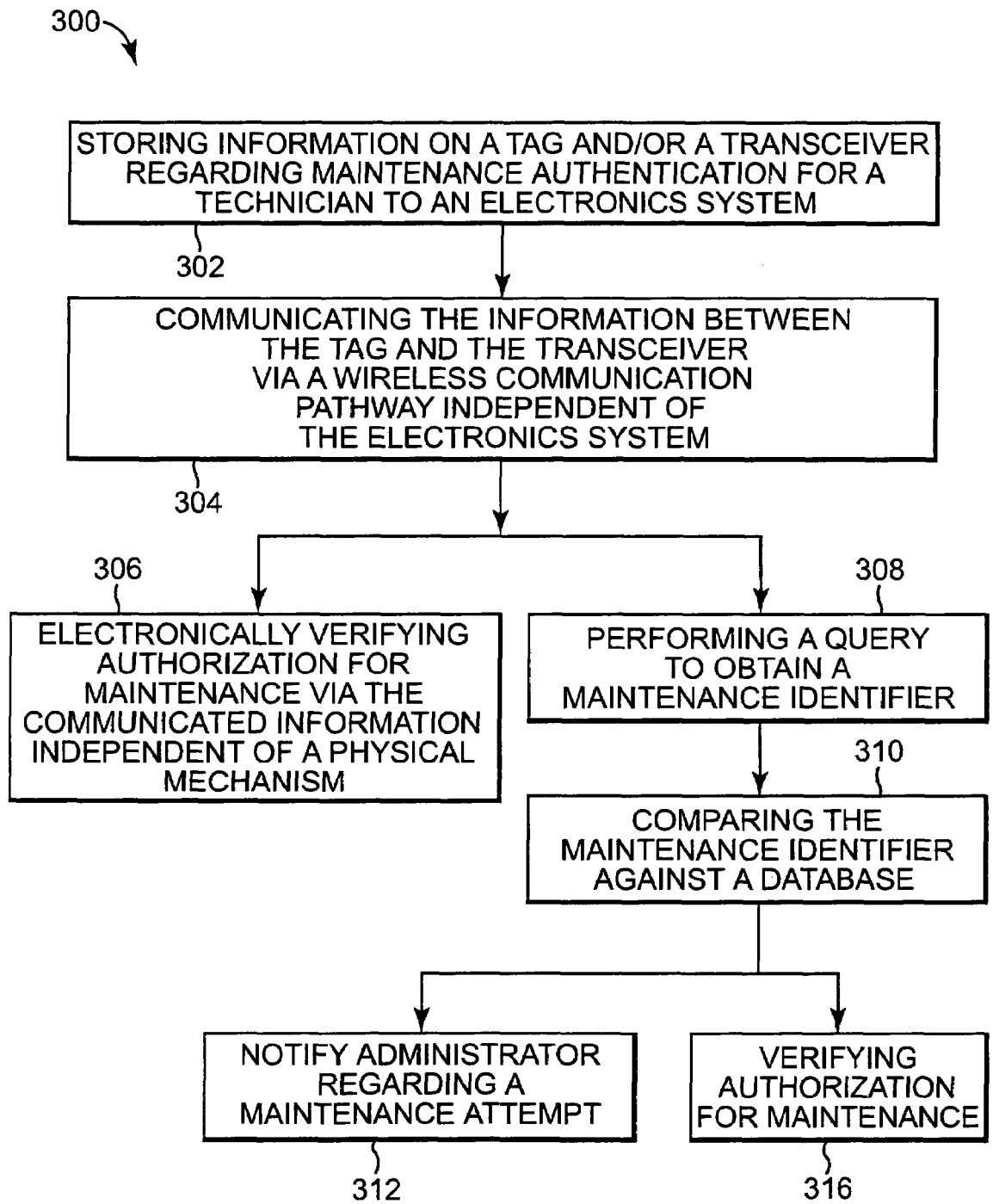
FIG. 7 is a flow diagram of a method of controlling maintenance access to a computer system, according to an embodiment of the invention.

FIG. 7 is a flow diagram of a method 300 of controlling maintenance access an electronics system, according to one embodiment of the invention. In one embodiment, the systems described and illustrated in association with FIGS. 1-6 are used to perform method 300.

As shown in FIG. 7, at 302 method 300 comprises storing information (e.g., a maintenance identifier) on a first wireless communicator (e.g., a RFID tag or RFID transceiver) associated with an electronics unit regarding maintenance authentication for a technician to the electronics unit of an electronics system. At 304, the information is communicated along a wireless communication pathway independent of the components of the electronics system via the first wireless communicator and a second wireless communicator (e.g., a RFID tag and/or RFID transceiver) associated with the technician (or other personnel) seeking access to the electronics system. In one embodiment, this wireless communication pathway is embodied in a RFID transceiver associated with the electronics unit and a RFID transponder tag associated with the technician. In another embodiment, the pathway is embodied in a first RFID transponder tag associated with the electronics unit and a RFID transceiver associated with the technician via a mobile computing device. In one aspect, a second RFID transponder tag is worn by the individual for wireless authentication with the mobile computing device to insure that the mobile computing device is used only be authorized personnel.

In one embodiment, at 306 method 300 further comprises electronically verifying authorization for maintenance to the electronics via the wirelessly communicated information. This electronic confirmation of authorization for maintenance access to the computer system is independent of a physical access mechanism, such as conventional card readers and/or biometric devices. However, in one embodiment, a physical access mechanism is provided in addition to a wireless access of the present invention to further secure the electronics system from unauthorized access.

In another embodiment, at 308 method 300 comprises performing a query between the respective RFID transponder tags and RFID transceivers (in the arrangements described in the embodiments of method 300 at 302-306) to obtain a maintenance identifier associated with a technician. At 310, the maintenance identifier associated with the technician and/or electronics unit is compared against a database of information relating to maintenance authentication for the technician and/or electronics unit. In one embodiment, the database is internal to electronics system 100 within manager 140, while in another embodiment, the database is external to electronics system 100, such as database 184 of external system 180 (FIG. 3).

In one embodiment, at 312 an administrator is notified of an attempt to access the electronics system based on the comparison at 310. The notice is provided when access fails and/or when access is successful.

In another embodiment, at 316 authorization for access is verified based on the comparison at 310.

Accordingly, a method of controlling access to an electronics system via a wireless communication pathway enables electronic verification of authorization to perform maintenance on the electronics system.

Embodiments of the invention greatly simplify the task of implementing a maintenance control system for an electronics system by effectively permitting the overlay of wireless communication mechanisms outside of the conventional functions, communication pathways, and connections/or of the electronics system. These embodiments insure that only authorized individual will be performing maintenance on the electronics system, and components thereof, and/or that the particular electronics unit/systems are quickly and affirmatively identified by the technician entering an access area to the electronics system(s).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A maintenance control system comprising:
an electronic access area;
a computer positioned in the electronic access area and including a first RFID communicator;
a tag including a second RFID communicator and configured to be physically associated with an individual;
a first access manager configured to grant access, upon presence of the second RFID communicator of the tag within the electronic access area, wherein the individual is granted access to perform maintenance on the computer upon verification of the identity of the individual via wireless communication between the first RFID communicator of the computer and the second RFID communicator of the tag regarding a maintenance access identifier stored within a memory of at least one of the first RFID communicator and the second RFID communicator; and
a mobile computing device including a third RFID wireless communicator in wireless communication with the second RFID wireless communicator of the tag and in communication with the first wireless RFID communicator of the computer, the mobile computing device including a second access manager configured to grant access to operate the mobile computing device to perform maintenance on the computer upon verification of the identity of the individual via wireless communication between the third RFID communicator of the mobile computing device and the second RFID communicator of the tag regarding the maintenance access identifier.

2. The maintenance control system of claim 1 wherein the maintenance access identifier comprises at least one of a personnel identifier, an identifier of the computer, and an identifier of the mobile computing device.

3. The maintenance control system of claim 1 wherein the respective first and second access managers comprise at least one of:
   a level module configured to determine a level of computer access that is granted, the level including at least one of a unit, a system, a network, and a global system; and
   a privilege module configured to determine a type of individual to which access is granted, the type including at least one of an original equipment manufacturer technician, an authorized third party technician manager, and an administrator;
   a personnel database; and
   an access database.

4. The maintenance control system of claim 1 wherein the respective first and second access managers comprise:
   a comparator module configured to determine authentication by comparing the maintenance access identifier with a predetermined criteria of the respective first and second access mangers; and
   an activator module configured to control access to the computer based upon the authentication determination by the comparator module.

5. The maintenance control system of claim 4 wherein the activator module comprises an enable function to selectively enable access to the computer.

6. The maintenance control system of claim 5 wherein the activator module comprises a warn function for producing a warning that authentication is not granted for the individual to at least one of the computer and the mobile computing device.

7. The maintenance control system of claim 1 wherein the respective first and second access managers comprise:
   a register including an electronics tracking module and a personnel tracking module, which in combination, enable tracking of maintenance access by the individual to the computer.

8. The maintenance control system of claim 1, and further comprising:
   a second computer, separate and external to the computer, in communication with the computer and configured to monitor access at the computer, the second computer including a database of personnel information and access information to enable the first access manager to control maintenance access to the computer.

9. A method of monitoring access to a server, the method comprising:
   providing at least one server that includes a first RFID communicator;
   storing control information on at least a second RFID communicator tag that is configured to be physically associated with an individual, wherein the control information controls access to at least one server and the control information includes a maintenance access identifier;
   providing a mobile computing device that includes a third RFID communicator and that is configured to perform maintenance on the at least one server;
   preventing access to the mobile computing by the individual unless the control information is authenticated via wireless communication between the second RFID communicator tag and a third RFID communicator of the mobile computing device; and
   preventing access to the at least one server by the mobile computing device unless the control information is authenticated via wireless communication between the third RFID communicator of the mobile computing device and the first RFID communicator of the at least one server and authenticated via wireless communication between the second RFID communicator tag and the first RFID communicator of the at least one server.

10. The method of claim 9 wherein storing control information comprises storing a privilege identifier configured to determine a type of access, the type including at least one of an original equipment manufacturer technician, an authorized third party technician, and an administrator.

11. The method of claim 9 wherein storing control information comprises storing a level identifier configured to determine a level of access, the level including at least one of a unit, a local system, a network, and a global system.

12. The method of claim 9 wherein preventing access to the at least one server comprises automatically identifying, via the personnel identifier and the access identifier, the at least one server for which access is granted from among a plurality of servers wherein the plurality of servers includes a first portion for which access is not authorized for the individual and a second portion for which access is authorized for the individual, the second portion including the at least one server for which access is granted.

13. The method of claim 9 wherein communicating the information comprises:
   electronically verifying authorization for access via the communicated information in addition to conditioning access via a physical access mechanism and via a password access mechanism.

14. The method of claim 9 wherein preventing access to the at least one server or the mobile computing device comprises:
   querying at least one of the first RFID communicator, the second RFID communicator, and the third RFID communicator to obtain the maintenance access identifier; and
   comparing the maintenance access identifier against a database of component information including at least one of:
   verifying authorization for access; and
   notifying an administrator regarding attempted access to the at least one server.

15. The method of claim 9 wherein preventing access to the at least one server comprises:
   providing a manager in wired communication with a plurality of servers which includes the at least one server; and
   arranging the manager to include an authenticator separate and external to the respective servers to control maintenance access to the respective server.

16. A computer network comprising:
   a plurality of computers;
   a plurality of computers, each computer including a first RFID communicator, wherein the first RFID communicator includes at least one of a RFID transceiver or a RFID transponder and stores a maintenance access identifier;
   a tag including a second RFID communicator configured to be in wireless communication with the first RFID communicator, wherein the tag is configured to be physically associated with an individual, a mobile computing device including a third RFID communicator configured to be in wireless communication with the first RFID communicator and the second RFID communicator, wherein the mobile computing device is configured to perform maintenance on the respective computers; and a manager configured to control access to each respective computer via wireless communication regarding the maintenance access identifier, wherein the manager is configured to grant access to the individual to operate the mobile computing device to perform maintenance on at least one of the respective computers upon verification of the identity of the individual via wireless communication between the third RFID communicator of the mobile computing device and the second RFID communicator of the tag regarding the maintenance access identifier, and upon verification of the identity of the individual via wireless communication between the third RFID communicator of the mobile computing device and the first RFID communicator of the respective computers regarding the maintenance access identifier.

17. The computer network of claim 16 wherein the plurality of computers comprises at least one server for which access is authenticated via the maintenance access identifier.

18. The computer network of claim 16 wherein the mobile computing device includes the manager.

19. The computer network of claim 16 wherein one of the respective computers includes the manager.

20. The computer network of claim 16 wherein an external computer that is external to the plurality of computers includes the manager and is in wireless communication with at least one of the mobile computing device or one of the respective computers.

* * * * *

UNITED STATES PATENT AND TRADEMARK OFFICE
CERTIFICATE OF CORRECTION

PATENT NO. : 7,607,014 B2 Page 1 of 1
APPLICATION NO. : 11/171928
DATED : October 20, 2009
INVENTOR(S) : Thane Michael Larson et al.

It is certified that error appears in the above-identified patent and that said Letters Patent is hereby corrected as shown below:

In column 14, line 56, in Claim 15, delete "server." and insert -- servers. --, therefor.

Signed and Sealed this

Thirtieth Day of March, 2010

David J. Kappos
*Director of the United States Patent and Trademark Office*